Nov. 28, 1933.    T. M. PARDUE ET AL    1,937,241
AIRPLANE INSTRUCTION DEVICE
Filed Feb. 24, 1930    5 Sheets-Sheet 1

Fig. 1.

Inventors.
Theodore M. Pardue,
John L. Pardue,
by Rippey & Kingsland.
Their Attorneys.

Nov. 28, 1933.  T. M. PARDUE ET AL  1,937,241
AIRPLANE INSTRUCTION DEVICE
Filed Feb. 24, 1930   5 Sheets-Sheet 3

Inventors.
Theodore M. Pardue,
John L. Pardue,
By Rippey & Kingsland.
Their Attorneys.

Nov. 28, 1933.  T. M. PARDUE ET AL  1,937,241
AIRPLANE INSTRUCTION DEVICE
Filed Feb. 24, 1930    5 Sheets-Sheet 4

Inventors.
Theodore M. Pardue,
John L. Pardue,
by Rippey & Kingsland
Their Attorneys.

Nov. 28, 1933.  T. M. PARDUE ET AL  1,937,241
AIRPLANE INSTRUCTION DEVICE
Filed Feb. 24, 1930   5 Sheets-Sheet 5

Patented Nov. 28, 1933

1,937,241

UNITED STATES PATENT OFFICE 1,937,241

AIRPLANE INSTRUCTION DEVICE

Theodore M. Pardue and John L. Pardue, St. Louis, Mo.

Application February 24, 1930. Serial No. 430,668

20 Claims. (Cl. 35—12)

This invention relates to airplane instruction devices for use in demonstrating the construction and the operations of airplanes.

An object of the invention is to provide a support for an airplane, or for a model of an airplane, and mechanism for operating said airplane or model so as to demonstrate said operations and the effects thereof, thus enabling the student or observer to make close study and observation of the actions and operations of the different mechanisms and parts of an airplane, and thereby derive a clear understanding of the functions, purposes and uses of all of the parts of the airplane.

Another object of the invention is to provide mechanism for operating the ailerons to incline the airplane toward one side or the other, and then moving the airplane to the proper inclination, and performing these operations in the natural order in which they actually occur when such operations are performed on an airplane in flight.

Another object of the invention is to provide mechanism for operating the rudder to change the horizontal direction of the longitudinal axis of the airplane, and mechanism for operating the elevators which are in connection with the stabilizer, in order to cause the airplane to rise or to descend, and for subsequently changing the course of the airplane in the natural order in which these operations occur on an airplane in flight.

Another object of the invention is to provide an airplane instruction device comprising an airplane, or a model of an airplane, and means for manipulating the same to form many of the evolutions of an airplane in flight, so that the student or observer may readily observe and understand the purposes, causes and effects of the different operations.

Another object of the invention is to provide mechanism for operating the rudder, and then actually turning the airplane in the direction that the changed position of the rudder would indicate it should go.

Another object of the invention is to provide mechanism for operating the elevators, and causing the airplane to tilt upwardly or downwardly, and then to move upwardly or downwardly in harmony with the changed position of the elevators.

Another object of the invention is to provide mechanism not only to operate the ailerons and then tilt the plane to proper position, and further not only to change the position of the rudder and then to turn the airplane to the proper direction, and still further not only to operate the elevators and then tilt airplane either upwardly or downwardly and then actually to raise or lower the airplane, but to perform any or all of the above operations either separately or simultaneously, such as is actually done by an airplane in flight.

Another object of the invention is to provide mechanism to perform all of the above-mentioned operations without the assistance of wind or air currents from the propeller or any other source.

Various other objects and advantages will appear from the following description, reference being made to the accompanying drawings, in which—

Fig. 8 is a cross-sectional view approximately on the line 8—8 of Fig. 2.

The airplane, or model airplane, shown comprises a fuselage 1, a propeller shaft 2, a propeller 3 attached to said shaft 2 beyond the front end of the fuselage, a motor device 4 for rotating the shaft 2 and thereby the propeller 3, wings 5 attached to the fuselage in a desired relationship, an aileron 6 hinged to the left wing 5, an aileron 7 hinged to the right wing 5, a stabilizer 8 attached to the rear end of the fuselage 1, a rudder 9 hinged to the rear end of the fuselage rearwardly of the stabilizer 8, a pair of elevators 10 hinged to the rear edge of the stabilizer 8 in spaced relationship so as to permit of lateral swinging movements of the rudder 9, and a landing gear 11.

Figure 6:
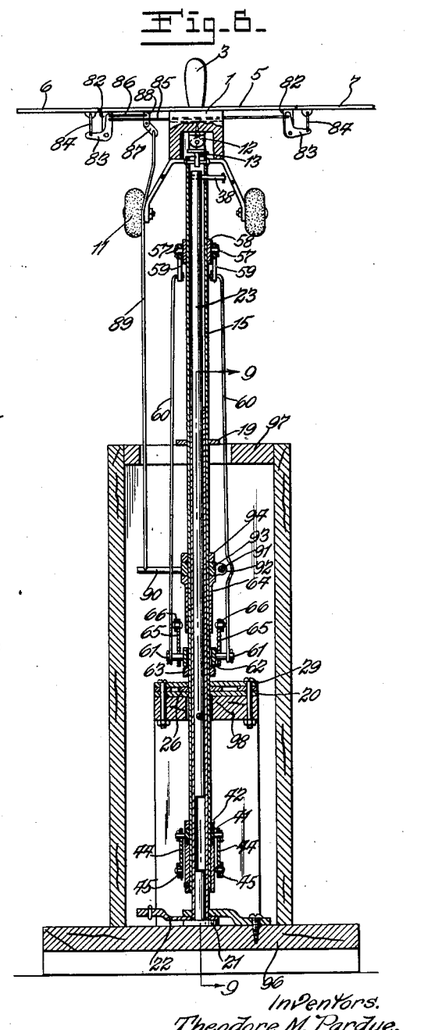
Fig. 6 is a sectional view approximately on the line 6—6 of Fig. 1.
Figure 7:
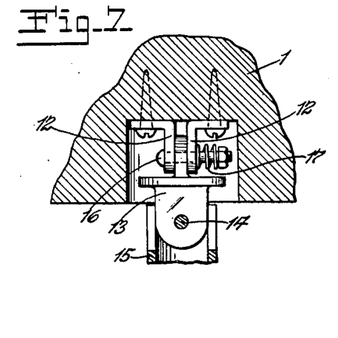
Fig. 7 is a view showing the pivotal connection of the airplane with the supporting shaft therefor.
Figures 9, 10, 11, 12, 13, 14:
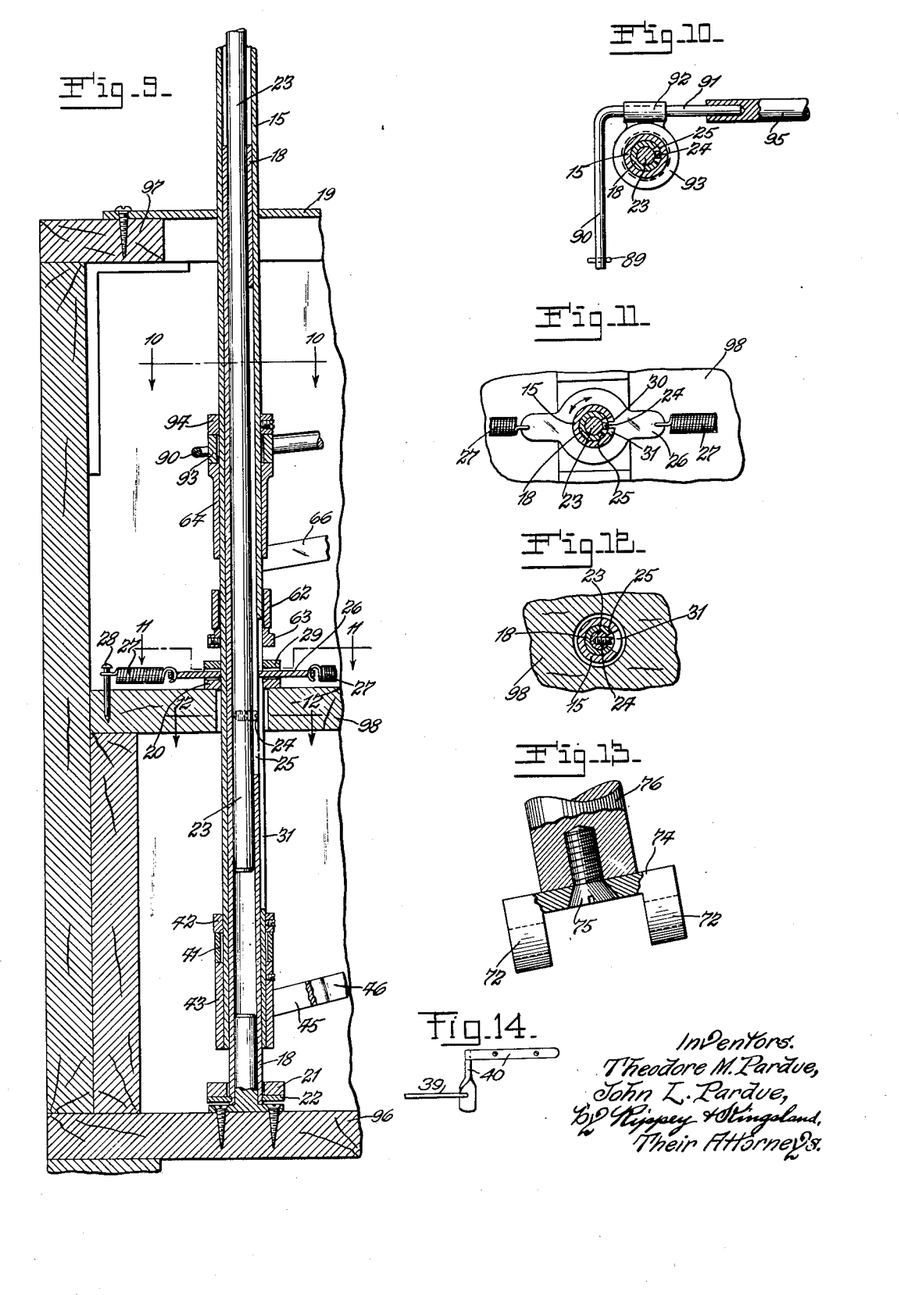
Fig. 9 is an enlarged sectional view approximately on the line 9—9 of Fig. 6.
Fig. 10 is a sectional view on the line 10—10 of Fig. 9, showing a part of the connections for operating the ailerons.
Fig. 11 is a sectional view approximately on the line 11—11 of Fig. 9.
Fig. 12 is a sectional view approximately on the line 12—12 of Fig. 9.
Fig. 13 is a detail view of the connection of the stick or operating lever with a bracket that engages a part to be operated thereby.
Fig. 14 is a plan view of a lever attached to the rudder.

A pair of brackets 12 (Figs. 6 and 7) is attached to the fuselage 1. A joint member 13 is mounted on a pivot 14 supported by the upper end of a tube 15. A pivot 16 mounted on the joint member 13 at right angles to the axis of the pivot 14 extends through the brackets 12 and pivotally supports the airplane. A spring 17 on the pivot 16 presses against one of the brackets 12 to hold said brackets 12 in frictional engagement with the joint member 13. Thus, the airplane is supported by the tube 15 so that the airplane may be tilted longitudinally to nose upwardly or downwardly, or may be tilted laterally, as in turning or changing the direction of flight.

The tube 15 is mounted for sliding movements along and for turning movements about a tube 18 and is mounted in spaced guides 19 and 20. The lower end of the tube 18 is mounted in a bearing 21 and has attached thereto a lever 22. Thus the tube 15 is capable of longitudinal movements along the tube 18 and is capable of turning movements about said tube 18; and the tube 18 is incapable of longitudinal movements but may be rocked by operation of the lever 22. The tube 18 has a neutral or starting position from which it may be turned in either direction to a limited extent by operation of the lever 22. The initial portion of the turning movement of the tube 18 in either direction from its starting position is independent of the tube 15, and the final portion of the turning movement of the tube 18 in either direction from its starting position is utilized to turn the tube 15.

A rod 23 is mounted for longitudinal sliding movements in the tube 18 and is turned by said tube so that said rod 23 is capable of turning from its starting position in either direction, while the tube 15 remains stationary during the initial portion of said turning movement of the rod 23. Said rod 23 has a key 24 engaging in a slot 25 in the tube 18. This key functions to turn the rod 23 by the tube 18 and to permit longitudinal movements of the rod 23 while the tube 18 remains stationary.

The tube 15 has a neutral or starting position to which said tube may be automatically returned after each turning movement thereof. As shown, a lever 26 has springs 27 connecting its opposite ends with stationary fasteners 28. The tube 15 extends through a hole in the lever 26, but does not move said lever 26 longitudinally when said tube 15 is moved longitudinally. The lever 26 is mounted between the guide 20 and a similar rigid guide 29, which arrangement permits longitudinal movements of the tube 15 while the lever 26 remains stationary. A tongue 30 on the lever 26 projects into a slot 31 in the tube 15 so as to rock said tube 15 by the lever 26 and permit longitudinal movements of the tube 15 while the lever 26 remains stationary.

Figure 1:
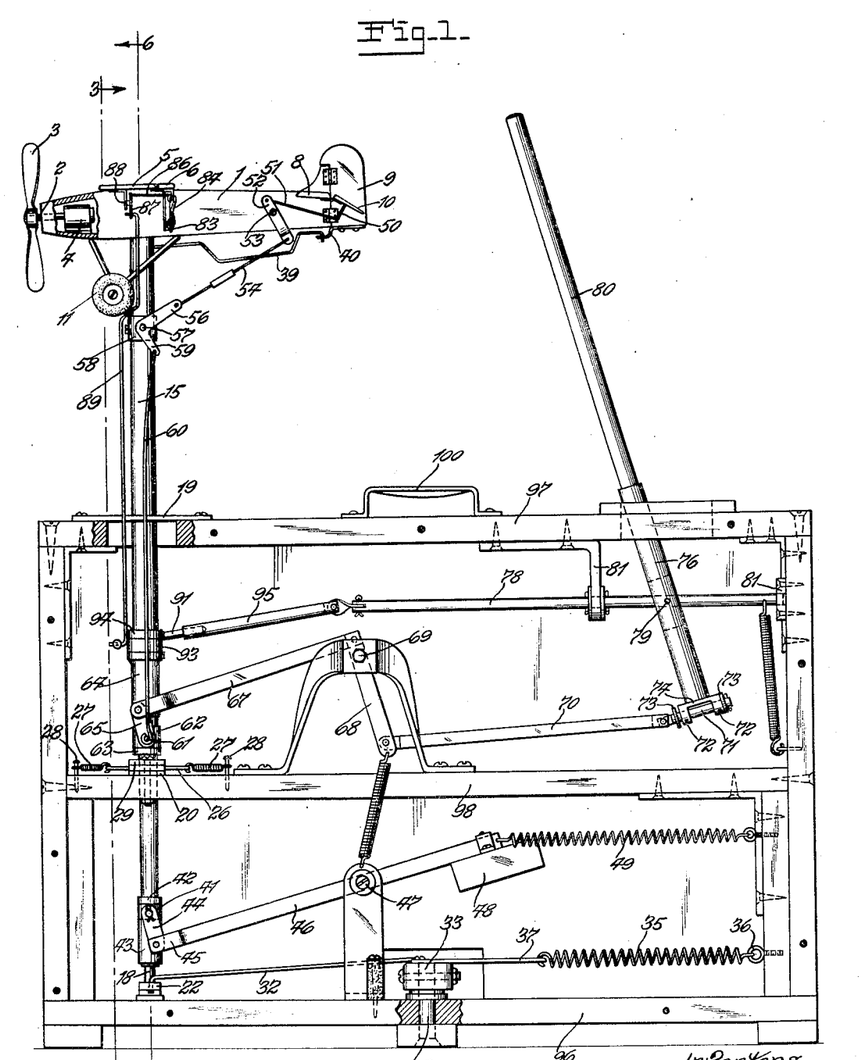
Fig. 1 is a side elevation of the invention, showing the mechanism adjusted to direct the flight of the airplane downwardly and forwardly.

A link 32 has one end pivoted to the lever 22 and its opposite end pivoted to a lever 33 corresponding to the foot bar of an airplane which, as is known, constitutes means for operating the rudder to steer the airplane. That is to say, some airplanes are equipped with foot bars having connections for operating the rudder, and this lever 33 is the analogue of such a foot bar. The lever 33 is mounted on a pivot 34 (Fig. 1) and the connection of the link 32 with said lever 33 is laterally from the axis of said pivot, so that opposite turning movements of the lever 33 on its pivot will move the link 32 longitudinally in opposite directions and thereby turn the tube 18 in opposite directions, according to the direction in which the lever is moved. If desired, a spring 35 may be used to actuate the lever 33 to its neutral or starting position, in which the tube 18 is held in the position it occupies when the rudder 9 extends straight to the rear in the direction of the longitudinal axis of the airplane. One end of the spring 35 is connected to a fixed member 36, and the opposite end of said spring is connected to an arm 37 rigidly secured to the lever 33 above the pivot 34.

Figures 2, 3:
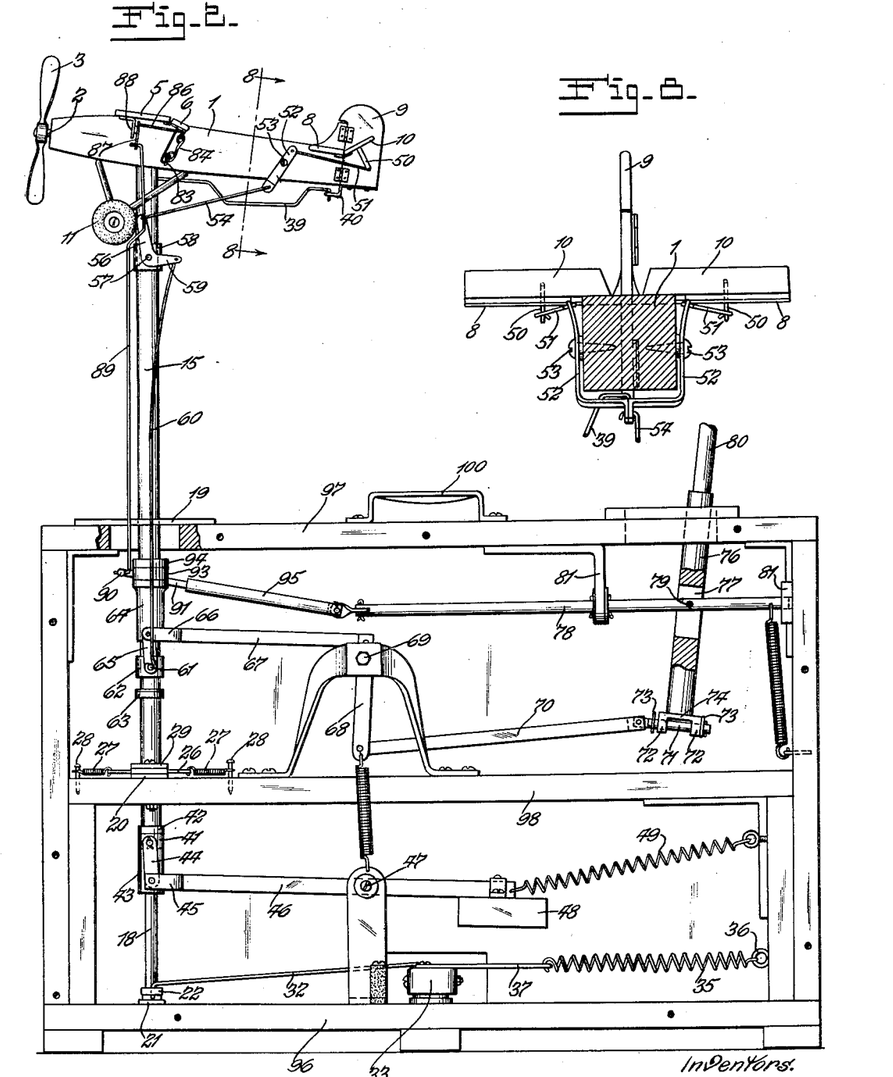
Fig. 2 is a similar view showing the mechanism adjusted to cause the airplane to ascend.
Fig. 3 is a sectional view of the casing on the line 3—3 of Fig. 1, the mechanism being adjusted to operate the ailerons to incline the airplane laterally in one direction, as shown.
Figure 3:
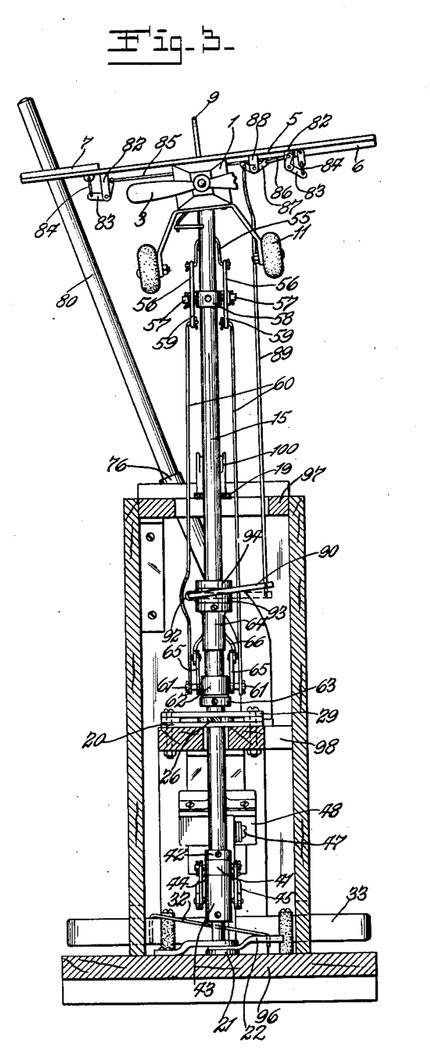
Figure 4:
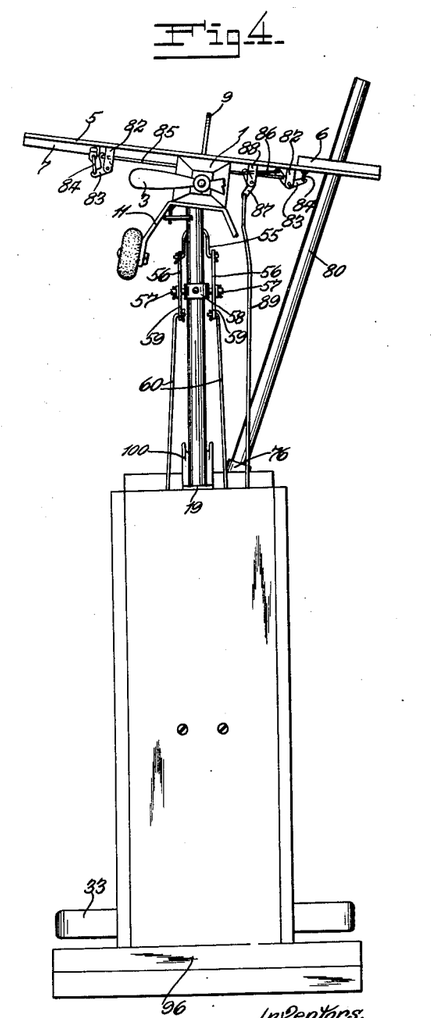
Fig. 4 is a front elevation showing the airplane inclined in the opposite direction.

The upper end of the rod 23 has attached thereto a pin 38 (Figs. 3, 4 and 6) projecting through an elongated circumferential slot in the tube 15. Thus, the tube 15 and the rod 23 are capable of independent turning movements. The pin 38 has pivotal connection with the front end of a link 39. The rear end of the link 39 is pivoted to the outer end of a lever 40 projecting laterally from the lower end of the rudder 9. It is now clear that operation of the lever 33 in one direction will cause the connections therefrom to the rudder 9 to swing the rudder 9 laterally in one direction from the longitudinal axis of the airplane; and that operation of the lever 33 in the opposite direction will cause said connections to swing the rudder 9 laterally in the opposite direction from the longitudinal axis of the airplane. It is also clear that these movements of the rudder may be effected without turning the airplane. These connections from the lever 33 to the lever 40 are proportioned and arranged so that during the initial portion of the movement of the lever 33, the rudder 9 is turned to the desired lateral position without turning the airplane about the axis of the tube 15, and so that during the final movement of the lever 33 from its starting position and after the rudder 9 has been swung laterally as far as it may go, the airplane is turned about the axis of the tube 15 approximately to one of the positions indicated in Fig. 5. This turning movement of the airplane is effected necessarily because, after further lateral swinging movement of the rudder 9 is stopped, any additional movement of the link 39 by further turning of the rod 23 will turn the airplane 1 to one of the positions clearly indicated in Fig. 5. When the lever 33 is released, the spring 35, if used, will act to restore said lever 33 and the connections therefrom to the rudder 9, and including said rudder 9, to their initial or starting positions in which the rudder 9 is in the longitudinal axis of the airplane.

The turning movement of the airplane as described necessarily turns the tube 15 on which said airplane is supported. The springs 27 act, on release of the lever 33, to turn the tube 15, and thereby the airplane, to their starting positions.

A ring 41 is mounted on the lower end portion of the tube 15 for free turning movements between an upper collar 42 and a lower collar 43 rigidly attached to said tube 15. A pair of depending links 44 have their upper ends pivoted to diametrically opposite sides of said ring 41 and their lower ends pivoted, respectively, to the arms 45 on the front end of a lever 46. Said lever 46 is mounted intermediate its ends for vertical swinging movements on a horizontal pivot 47. A counterweight 48 is supported by the free end of the lever 46 and may be assisted by a spring 49 so as to counterbalance the tube 15 and the other parts supported thereby, including the airplane.

Each of the elevators 10 has attached to its underside a downwardly extending arm 50. Links 51 have their rear ends pivoted to the lower ends of the respective arms 50, and have their forward ends pivoted to the upper ends of the arms of a bifurcated lever 52. The bifurcated lever 52 embraces the rear portion of the fuselage between its arms, and the arms of said lever 52 are supported on axially alined pivots 53 on opposite sides of the fuselage 1. The connection between the arms of the lever 52 has pivoted thereto the rear end of a link 54. The front end of the link 54 has diverging arms 55 (Fig. 3) whose extremities are pivoted to the upwardly extended arms 56 of a pair of bell crank levers. These bell crank levers are mounted on pivots 57 projecting laterally from diametrically opposite sides of a collar 58 which is attached to the tube 15. The rearwardly extended arms 59 of said bell crank levers are pivotally connected to the upper ends of downwardly extended links 60. The lower ends of said links 60 are connected to the outer ends of pivot members 61 projecting laterally from diametrically opposite sides of a collar 62 mounted loosely on the tube 15 for limited longitudinal sliding movements along said tube between a lower collar 63 and an upper collar 64, both of which are rigid on said tube 15.

A pair of links 65 have their lower ends, respectively, pivoted to the pivots 61, and their upper ends pivoted to the arms 66 of a bifurcated lever 67. The opposite end of the lever 67 is rigid with the upper end of a lever 68 mounted intermediate its ends on a pivot 69. Thus the levers 67 and 68 really constitute a bell crank lever. The lower end of the lever 68 is pivoted to one end of a link 70. The opposite end of the link 70 is pivoted to one end of an axial member 71. A bracket has its two arms 72 (Fig. 2) pivoted for turning movements on the member 71 and limited as to longitudinal movements by abutments 73. The connecting portion 74 of said bracket is secured by a pivot screw 75 to the lower end of a socket member 76 so as to permit such turning movement of the bracket 74 with respect to the axis of the socket member 76 as may be necessary in the operation of the device. The socket member 76 has therethrough a hole 77 through which a rod 78 extends. The socket member 76 is pivotally supported by the rod 78 by means of a pivot 79. The socket member 76 encloses the lower end of an operating lever or stick 80. The rod 78 is supported for turning movements in bearings 81, but is incapable of longitudinal movements.

It is now clear that longitudinal movements of the link 70 caused by operation of the lever 76—80 will operate the bell crank lever 67—68; that such operation of the lever 67—68 will cause the collar 62 to raise or to lower the tube 15, depending upon the direction of movement of said link 70. In the normal or starting positions of the parts, the collar 62 is approximately midway between the collars 63 and 64, so that said collar 62 is capable of movement to a limited extent in either direction from its starting position before movement of the tube 15 begins. This initial or independent movement of the collar 62 is sufficient to operate the elevators 10 to positions required to cause the airplane to nose up or down. The initial portion of this independent movement of the collar 62 adjusts the elevators 10 upwardly or downwardly, depending upon the direction of movement of the collar 62; and the final portion of this independent movement of the collar 62 along the tube 15 is utilized to move the airplane to an inclined position, such as the airplane would be caused to assume in flight by the adjusted positions of the elevators. Any further upward movement of the collar 62 after the elevators 10 have been adjusted and after the airplane has been tilted will move the tube 15 upwardly and thereby move the airplane upwardly. But, as stated, this upward movement of the tube 15 and of the airplane is effected only after the elevators 10 have been adjusted and after the airplane has been tilted, so that all of these movements are noticeably distinct.

Each of the airplane wings 5 has rigid therewith a depending arm 82. A bell crank lever 83 is pivoted to the lower end of each arm 82. A pair of links 84 have their lower ends pivoted to the respective bell crank levers 83 and their upper ends pivoted to the respective ailerons 6 and 7. A link 85 connects the bell crank levers 83 so that said bell crank levers are required to operate in unison. Longitudinal movement of the link 85 toward the aileron 6 and away from the aileron 7 will simultaneously swing downwardly the aileron 6 and swing upwardly the aileron 7, and vice versa. One of the levers 83 is connected by a link 86 with the outer end of a lever 87 pivoted on a support 88 extending downwardly from one of the airplane wings. A link 89 has its upper end pivoted to the inner end of the lever 87 and its lower end pivoted to an arm 90 of an angular lever. The opposite arm 91 of said angular lever is mounted for turning movements in a bearing 92 projecting from a collar 93 mounted loosely on the tube 15 between the upper end of the collar 64 and a cooperating collar 94 rigid on the tube 15. This leaves the tube 15 free to turn within the collar 93. A link 95 has one end provided with non-rotative sliding connection with the lever arm 91 and the opposite end pivoted to the rod 78. It is now clear that turning movements of the rod 78 will turn the lever 90—91 about the axis of the arm 91 of said lever and will thereby raise or lower the end of the arm 90 of said angular lever, depending upon the direction in which the rod 78 is turned. When the end of the lever arm 90 is raised, the link 89 and the connections controlled thereby are moved in a direction and to an extent simultaneously to swing downwardly the aileron 6 and to swing upwardly the aileron 7; and when the end of the lever arm 90 is moved downwardly, said connections are operated simultaneously to swing upwardly the aileron 6 and to swing downwardly the aileron 7. These swinging movements of the ailerons are accompanied by lateral tilting of the airplane, as would occur if the ailerons were operated as described on an airplane in flight.

This improved mechanism may be mounted in different ways. As shown, many of the operating parts are supported and enclosed within a case comprising a bottom wall 96, a top wall 97 and an intermediate horizontal partition 98. The airplane is supported at a suitable distance above the top wall so that all movements of all parts of the airplane may be clearly seen while much of the mechanism for effecting said movements is enclosed in the case. The guide 19 is secured to the top wall 97 and the guide 20 is secured to the partition 98.

The lever or stick comprising the members 80 and 76 project through an opening 99 in the top wall 97. The edges of the walls of said opening 99 constitute abutments and guides limiting extent of movement of the lever or stick 80—76 and guiding said movements. The walls of the opening 99 also serve to prevent any of the parts from being strained by moving the lever or stick 80 beyond its intended position.

The entire device shown is readily portable, and for this purpose a handle 100 may be attached to the top wall 97 of the case.

Figure 5:
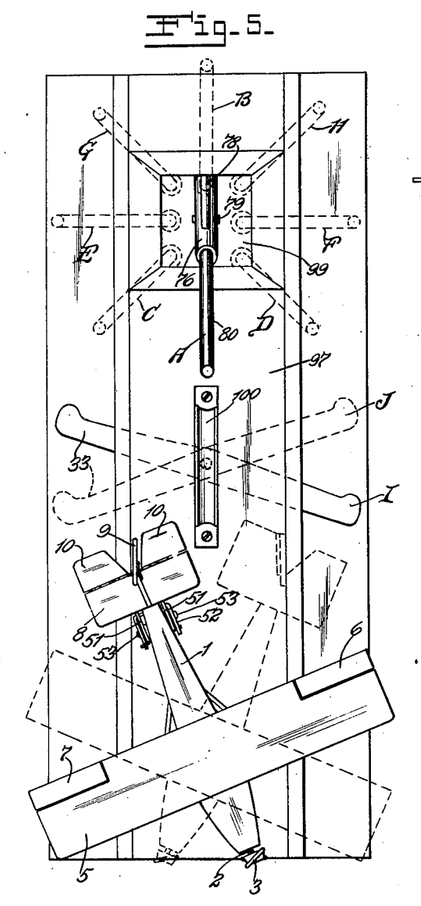
Fig. 5 is a plan view of the device, the broken lines indicating different positions of the parts.

All of the above described operations of the airplane are performed by operation of the lever 33 and by operation of the stick or lever 80. Various adjusted positions of the lever or stick 80 and of the lever 33 are shown in Fig. 5. When the airplane is in straight-away flight, the ailerons 6 and 7 are in alinement with each other and with the wings 5, the rudder 9 is alined with the longitudinal axis of the airplane, and the elevators 10 are in alinement with the stabilizer 8. In this straight-away flying adjustment of the airplane, the stick or lever 80 is approximately vertical at the center of the opening 99. When said stick or lever 80 is moved forwardly toward the airplane against the forward edge of the opening 99 to the position A (Fig. 5), the elevators 10 are swung downwardly to the position shown in Fig. 1 during the initial portion of such forward movement of the stick or lever 80, and then during the final portion of the forward swinging movement of said stick or lever, the airplane is tilted or nosed downwardly to the direction that the changed position of the elevators indicates the airplane should go. The elevators 10 are inclined downwardly during the initial portion of this movement of the stick or lever 80 because the connections comprising the lever 52 and the links 51 move the elevators 10 to their downwardly inclined positions before said connections tilt the airplane. After the elevators 10 have been moved to their downwardly inclined positions by the initial forward movement of the stick or lever 80, the airplane is then tilted downwardly because the continued upward and rearward movement of the link 54 causes these connections 52, 51, etc. to push upwardly the rear end of the airplane. The forward swinging movement of the stick or lever 80 from its neutral or upright position also causes the bell crank lever 67 and 68 to push downwardly the collar 62 along the tube 15, causing said collar 62 to abut against the abutment 63 and thereby move the tube 15 downwardly. This downward movement of the tube 15 also moves with it the airplane.

Backward swinging movement of the stick or lever 80 to the position B moves the collar 62 upwardly along the tube 15 to contact with the lower end of the collar 64 so that continued movement of said stick or lever raises the tube 15, and thereby the airplane. The initial portion of this rearward movement of the stick or lever 80 is utilized to swing the elevators 10 upwardly to the position shown in Fig. 8; and the final portion of this rearward swinging movement of the stick or lever 80 is utilized to tilt the airplane upwardly.

Movement of the stick or lever 80 to the position C moves the tube 15 downwardly, swings the elevators 10 downwardly, swings downwardly the aileron 6 and upwardly the aileron 7, and tilts the front of the airplane downwardly and also tilts the airplane laterally and downwardly toward the right. The initial portion of this movement of the stick or lever 80 to the position C moves the ailerons 6 and 7 to these adjusted positions and also moves the elevators 10 to these adjusted positions during downward movement of the tube 15 of the airplane; and the final portion of the movement of this stick or lever 80 tilts the airplane, as indicated by the positions of the ailerons and the elevators.

Movement of the stick or lever 80 to the position D performs the same operations as are performed by movement of said stick or lever to the position C, with the exception that the aileron 6 is raised, the aileron 7 is lowered, and the airplane is tilted laterally to the position that such operations of the ailerons would cause an airplane in flight to assume.

Movement of the stick or lever 80 to the position E raises the aileron 7 and lowers the aileron 6, and tilts the airplane laterally to the position to which an airplane would be tilted in flight by such operations of the ailerons. This movement of the stick or lever 80 to the position E does not operate the elevators 10 nor tilt the front of the airplane upwardly or downwardly. Nor does this movement of the stick or lever 80 to the position E raise or lower the airplane.

Movement of the stick or lever 80 to the position F raises the aileron 6 and lowers the aileron 7, and tilts the airplane laterally in accordance with such operations of the ailerons. This movement of the stick or lever to the position F does not tilt the front of the airplane upwardly or downwardly, nor operate the elevators 10. Nor does this movement of the stick or lever 80 to the position F raise or lower the airplane.

Movement of the stick or lever 80 from neutral or upright position to the position G raises the airplane by raising the tube 15 to indicate clearly the effect on an airplane in flight of the operations of the ailerons and elevators performed during the initial portion of the movement of the stick or lever from its neutral position to said position G. Further, movement of the stick or lever from the position E to the position G will, during the initial portion of such movement, quickly raise the elevators 10, and will, during the final portion of such movement, raise the tube 15, and thereby the airplane, to indicate clearly to the student or observer that these operations will cause the airplane to ascend. Thus, movement of the stick or lever 80 from the position E to the position G first raises the elevators 10 and then raises the airplane bodily, as would occur in the case of an airplane in flight.

During initial movement of the stick or lever 80 from its vertical or neutral position to the position H, the aileron 7 is inclined downwardly and the aileron 6 is inclined upwardly, and the elevators 10 are inclined upwardly to positions which would cause the airplane to tilt laterally and to rise. During the final portion of such movement of the stick or lever from neutral or upright position to the position H, the airplane is tilted laterally and the front of the airplane is tilted upwardy as in rising. During such movement of the stick or lever 80 from its neutral or upright position to the position H, the airplane is raised.

It is clear that the stick or lever 80 may be moved from any one of its various positions to any other position, and that the order or direction of movement of the stick or lever 80 may be varied as desired. The foregoing description is simply illustrative of some of the movements of said stick or lever, and is by no means a description of all of the movements which may be performed. From the foregoing description, any other desired operation may be readily traced without specific description.

The foot bar or lever 33 normally extends straight across the casing intermediate of the two positions indicated in Fig. 5. Movement of the foot bar or lever 33 to the position I by the connections hereinbefore described in detail swings the airplane to the position indicated by solid lines in Fig. 5; and movement of the foot bar or lever 33 to the position J turns the airplane to the position indicated by broken lines in Fig. 5. The straight-across position of the foot bar or lever 33 adjusts the airplane for straight-ahead flight.

It is now clear that our invention obtains all of its intended objects and purposes in a highly efficient and satisfactory manner, and that the operations and adjustments of the airplane parts and control members, and the subsequent movements of the airplane responsive to such adjustments of said control members, occur in the natural order and sequence in which such operations would occur if performed on an airplane in flight. The construction and combination of parts may be widely varied within the scope of equivalent limits without departure from the nature and principle of the invention. We do not restrict ourselves in any unessential respects, but what we claim and desire to secure by Letters Patent is:—

1. An airplane instruction device, comprising an airplane having wings and ailerons in connection with the wings, in combination with a support for the airplane, and mechanism for moving the ailerons simultaneously to oppositely inclined positions and then tilting the airplane in conformity with the tilted positions indicated by the ailerons.

2. An airplane instruction device, comprising an airplane having wings and ailerons in connection with the wings, in combination with a lever, and connections from the lever for moving the ailerons to different positions of inclination with respect to the wings and for tilting the airplane corresponding to the inclinations of the ailerons.

3. An airplane instruction device, comprising an airplane having wings and ailerons in connection with the wings, in combination with a support for said airplane, a lever, a support for the lever at a distance from the airplane, and connections operated by said lever for operating the ailerons during the initial portion of the movement of said lever from the starting position and for tilting the airplane responsive to the positions of the ailerons during the final portion of the movement of said lever from said starting position.

4. An airplane instruction device, comprising an airplane having wings and ailerons in connection with the wings, in combination with a support for said airplane, a lever, a support for the lever at a distance from the airplane, connections operated by said lever for operating the ailerons during the initial portion of the movement of said lever from the starting position and for tilting the airplane responsive to the positions of the ailerons during the final portion of the movement of said lever from said starting position, and mechanism for tilting the airplane upwardly or downwardly as desired.

5. A device of the character described, comprising an airplane having wings and ailerons in connection with the wings, a vertically movable support for said airplane, a lever pivotally supported at a distance from the airplane, and connections operated by said lever for tilting the airplane upwardly or downwardly as desired and for tilting the airplane laterally in either direction as desired and for moving said support vertically to move the airplane to different altitudes.

6. An airplane instruction device, comprising an airplane having a stabilizer and elevators hinged to the stabilizer, in combination with mechanism movable from and to a starting position, and connections operated by said mechanism during the initial portion of its movement from said starting position for inclining said elevators and thereafter, during the final portion of the movement of said mechanism from said starting position, tilting the airplane upwardly or downwardly to indicate the tilted position of an airplane in flight effected by the tilting of the elevators thereon.

7. An airplane instruction device, comprising an airplane having ailerons, and mechanism for operating the ailerons to incline the airplane toward one side or the other and then moving the airplane to the proper inclination to indicate the inclination of an airplane in flight when the ailerons on such airplane are inclined as aforesaid.

8. An airplane instruction device, comprising an airplane having a rudder for changing the horizontal direction of the longitudinal axis of the airplane, in combination with mechanism for operating the rudder and for tilting the airplane, and additional mechanism for swinging the airplane to change the direction in conformity with the adjustment of the rudder.

9. An airplane instruction device, comprising an airplane having a rudder and elevators, in combination with a lever, means for supporting the airplane and the lever in spaced relationship, connections operated by the lever for tilting the airplane laterally and upwardly or downwardly as desired, and mechanism for operating the rudder to change the course of the airplane and thereafter swinging the airplane to a direction conforming to the adjustment of the rudder.

10. An airplane instruction device, comprising an airplane having wings, ailerons, elevators, and a rudder, a support for said airplane, and a lever pivotally supported at a distance from said airplane, in combination with mechanism operated by said lever for operating said ailerons and said elevators to different inclined positions and thereafter tilting and inclining the airplane in conformity with the inclined positions of said ailerons and elevators while the rudder remains stationary.

11. An airplane instruction device, comprising an airplane having wings, ailerons, elevators, and a rudder, a support for said airplane, and a lever pivotally supported at a distance from said airplane, in combination with mechanism operated by said lever for operating said ailerons and said elevators to different inclined positions and thereafter tilting and inclining the airplane in conformity with the inclined positions of said ailerons and elevators while the rudder remains stationary, and other mechanism for operating said rudder to indicate a changed direction of the airplane and thereafter swinging the airplane to the changed direction indicated by said rudder.

12. An airplane instruction device, comprising an airplane having wings, ailerons, elevators, and a rudder, a support for said airplane, and a lever pivotally supported at a distance from said airplane, in combination with mechanism operated by said lever for operating said ailerons and said elevators to different inclined positions and thereafter tilting and inclining the airplane in conformity with the inclined positions of said ailerons and elevators while the rudder remains stationary, other mechanism for operating said rudder to indicate a changed direction of the airplane and thereafter swinging the airplane to the changed direction indicated by said rudder, and mechanism for raising and lowering the airplane.

13. An airplane instruction device, comprising an airplane having a rudder, a stick pivotally supported at a distance from the airplane, and connections operated by said stick first to operate the rudder and then to turn the airplane in the direction that the changed position of the rudder indicates the airplane should go.

14. An airplane instruction device, comprising an airplane having elevators, in combination with a stick pivotally supported at a distance from the airplane, and mechanism operated by said stick for first operating the elevators and then causing the airplane to tilt upwardly or downwardly as the changed positions of the elevators indicates the airplane should go.

15. An airplane instruction device, comprising an airplane having elevators, in combination with a stick pivotally supported at a distance from the airplane, and mechanism operated by said stick for first operating the elevators and then causing the airplane to tilt upwardly or downwardly as the changed positions of the elevators indicates the airplane should go and then moving the airplane upwardly or downwardly as indicated by the changed positions of the elevators.

16. An airplane instruction device, comprising an airplane having ailerons, elevators, and a rudder, in combination with a stick pivotally supported at a distance from the airplane, and mechanism operated by said stick to operate the ailerons and then tilt the airplane to proper position according to the positions of the ailerons and to operate the elevators and then tilt the airplane laterally and upwardly or downwardly according to the lateral tilting required by the ailerons and the upward or downward tilting required by the elevators.

17. An airplane instruction device, comprising an airplane having ailerons, elevators, and a rudder, in combination with a stick pivotally supported at a distance from the airplane, mechanism operated by said stick to operate the ailerons and then tilt the airplane to proper position according to the positions of the ailerons and to operate the elevators and then tilt the airplane laterally and upwardly or downwardly according to the lateral tilting required by the ailerons and the upward or downward tilting required by the elevators, and mechanism for operating the rudder to indicate a changed position of the airplane and then swinging the airplane to the direction indicated by the changed position of the rudder.

18. In an airplane flying instructing apparatus, the combination of an imitation airplane, a vertical post, means for rotatably mounting said post at its base, and a universal joint member connecting the upper end of said post to said airplane.

19. An airplane instruction device comprising an elongated support rotative about its longitudinal axis, an airplane having a rudder for changing the horizontal direction of the longitudinal axis of the airplane, and elements pivotally supporting said airplane in connection with the upper end of said support whereby the airplane may be tilted longitudinally to nose upwardly or downwardly and may be tilted laterally, in combination with mechanism for operating said rudder and for tilting the airplane.

20. An airplane instruction device comprising an elongated support rotative about its longitudinal axis, an airplane having a rudder for changing the horizontal direction of the longitudinal axis of the airplane, and elements pivotally supporting said airplane in connection with the upper end of said support whereby the airplane may be tilted longitudinally to nose upwardly or downwardly and may be tilted laterally, in combination with a lever pivotally supported at a distance from the airplane, and connections operated by the lever for tilting the airplane laterally and upwardly or downwardly as desired.

THEODORE M. PARDUE.
JOHN L. PARDUE.